Patented June 15, 1948

2,443,269

UNITED STATES PATENT OFFICE 2,443,269

PRODUCTS OF THE FRIEDEL-CRAFTS CONDENSATION OF FURANE AND ITS DERIVATIVES WITH UNSATURATED TRIGLYCERIDES

Anderson W. Ralston, Miles R. McCorkle, and Robert J. Vander Wal, Chicago, Ill., assignors to Armour and Company, Chicago, Ill., a corporation of Illinois No Drawing. Application February 14, 1946,
Serial No. 647,656

8 Claims. (Cl. 260—345)

This invention relates to products prepared by a Friedel-Crafts catalyst condensation of furane and its derivatives with unsaturated triglycerides. These products are useful for resinous compounds.

Furane, and derivatives thereof, are well known chemical compounds readily isolated from naturally occurring substances, or prepared therefrom. Furfural, for instance, is obtained by the hydrolysis of pentosans under acid conditions and large amounts of this aldehyde can be obtained by hydrolyzing the pentosan content of such substances as bran, oat hulls, corn cobs, etc. Another example of a furane compound is coumarone which is benzo-furane. This substance is found in appreciable quantities in coal tar naphthas.

All furane derivatives polymerize rapidly upon heating and have been used extensively in the resin field. Most of the characteristic polymerization reactions of furane derivatives are due to the presence of the olefinic bonds in the furane ring. Furfural, on the other hand, contains an aldehyde group in addition to the unsaturated bonds. Its polymerization is, therefore, associated not only with the ethylenic bonds in the furane ring, but also with the presence of the aldehyde group. Owing to the presence of this aldehyde group furfural forms resins with phenols, amines and other aldehydes. Because of the presence of the ring unsaturation, in addition to the aldehyde group, furfural also polymerizes very rapidly in the presence of light.

Some of the other furane derivatives are somewhat more stable. Coumarone, for example, polymerizes only at the olefinic bonds of the furane ring and is, therefore, not as reactive as furfural. Furane itself also polymerizes only at the double bonds present in the ring and is therefore, more stable than furfural.

With acid catalysts furane derivatives such as coumarone, furfural, etc., polymerize very rapidly. Sulfuric acid and the various metallic halides are often used to promote their rapid polymerization into resinous compounds.

While furfural, coumarone and various related resins are satisfactory for a number of purposes, they possess some inherent defects which greatly limit their commercial importance. Furfural resins are usually very dark colored and are not highly light stable. Resins prepared from furane derivatives such as furfural, coumarone, etc. are also quite brittle when polymerized to the required degree of hardness. Their use in the metal coating field, in wire insulation and many other fields is greatly limited by their property of brittleness. Resins which are satisfactory for such purposes as coating black metal plate, etc. must dry to hard, flexible films which adhere strongly to the metal and do not crack, silk or peel when the metal is bent. Numerous substances have been suggested as plasticizers for these resins. Plasticized resins, however, have certain limitations and it is much more desirable for the property of flexibility to be inherent in the resin itself. In some cases where the simple plasticized product is used in contact with various solvents only the plasticizer is dissolved and the brittle resin remains behind. Under certain other conditions the plasticizing agent loses its miscibility with the resins and separates.

We have now discovered that compounds prepared from furane and its derivatives such as furfural and coumarone with glycerides of highly unsaturated fatty acids in the presence of Friedel-Crafts catalysts give products which are capable of undergoing further polymerization beyond our initial treatment and may be satisfactorily used as coating materials where a high degree of flexibility is desired. These compounds evidently result from a chemical reaction between the furane and the highly unsaturated glyceride, which reaction is promoted by and dependent upon the presence of the Friedel-Crafts catalyst.

We have found that reactions of this type require the presence of Friedel-Crafts catalysts such as metallic halides, and that they do not take place to any appreciable extent in the absence of such catalysts. Since our products do not result from a simple polymerization of the individual components but rather from a molecular reaction between them, it is desirable, but not absolutely necessary, to remove the catalyst by hydrolyzing with water or other hydrolyzing solvent and then wash the product free of acid by means of a suitable solvent. We have found that when the catalyst is not removed a slightly darker product with some tendency toward brittleness results.

We believe that this polymerization is between the olefinic bonds present in the glyceride and the unsaturated bonds present in the furane. Thus when furfural is condensed with an unsaturated glyceride it is the olefinic bonds of the furane nucleus and not the aldehyde group which is involved. In the case of coumarone and unsaturated glycerides the polymerization reaction involves the olefinic bonds of the acids present in the glycerides and the olefinic bonds of the furane ring.

We prefer to conduct the reaction in the presence of organic solvents, such as carbon tetrachloride, nitro benzene or chloroform. At the start of the reaction it is advisable to maintain the reactants at a temperature below the boiling point of the most volatile constituent. For example, when furane is used the initial temperature may be about 10° C. Once the reaction is started the temperature may be allowed to rise without any disadvantage, but we prefer to apply no heat, allowing the mixture to come to room temperature as the reaction proceeds. Suitably, we may use an ice bath to maintain the reactants cool for the initiation of the reaction and utilize the heat of reaction to slowly raise the temperature as the reaction proceeds.

Loss by volatilization may be prevented by carrying out the reaction under pressure but care should be taken to avoid rapid temperature rises, and to maintain the product in an incompletely polymerized state the temperature should not rise above 75° C.

We avoid carrying our polymerization to the final stage of polymerization since what we desire is a product capable of undergoing further polymerization upon subsequent baking or air drying in thin films. It is quite desirable that we start with unpolymerized furanes for the preparation of these products. While we can use polymerized furanes, such as polymerized furfural or coumarone, any substantial pre-polymerization of the furanes tends to reduce the film-forming properties of the final product. Though we prefer to start with an unpolymerized furane such as unpolymerized furfural or coumarone, it is possible to employ low molecular weight polymers such as the dimers or trimers. We may, in fact, use any compound which has an unsaturated furane ring.

We can use any high molecular weight glyceride material containing substantial amounts of polyene fatty acid radicals. For example, we may use fish oil, linseed oil, tung oil, or other oils, natural or synthetic, which have substantial amounts of highly unsaturated acid radicals. By "high molecular weight" glycerides we mean glycerides containing acid radicals having 18 or more carbon atoms.

The following examples can be given as illustrating our invention:

*Example 1*

Ninety five grams of a glyceride prepared from the unsaturated fatty acids of fish oils were dissolved in 100 cc. of carbon tetrachloride and thirty grams of furfural added. The solution was placed in a round bottom flask equipped with a mechanical stirrer, thermometer and dropping funnel. Ten grams of stannic chloride were dissolved in 100 cc. of carbon tetrachloride and the solution added dropwise to the flask over a period of thirty minutes. During this addition the reaction mixture was cooled in an ice bath and the temperature did not exceed 3° C. The reaction mixture was then allowed to stand for ten hours at room temperature after which time the catalyst was hydrolyzed by pouring into dilute hydrochloric acid (200 cc. of concentrated hydrochloric acid per liter). The product was then washed several times with a hydrochloric acid solution of the same concentration. It was then treated with a decolorizing charcoal and filtered. The solvent was removed under vacuum over a water bath. The yield was sixty-six grams of a reddish oil. It was soluble in xylene, turpentine, carbon tetrachloride and mineral spirits. A 50% solution of the product and mineral spirits was prepared and a sheet of black iron immersed in the solution. The iron plate was then drained and heated in an oven for one hour at 150° C. This formed a coating on the black plate which was hard and extremely flexible. The product was, therefore, satisfactory for metal coatings such as plates, wires, etc., where a combination of hardness and flexibility is required. Treatment with steam did not alter the coating.

*Example 2*

One hundred grams of a glyceride prepared from the unsaturated fatty acids of fish oil were dissolved in 50 cc. of carbon tetrachloride. To this mixture was added 95 grams of 39% resin content coumarone fraction. The mixture was placed in a round bottom three-necked flask equipped with a mechanical stirrer, thermometer and dropping funnel. Ten grams of stannic chloride dissolved in 100 cc. of carbon tetrachloride were then added slowly over a period of one hour and ten minutes. The temperature was maintained between 1° and 2° C. during this addition. The reaction mixture was then allowed to stand overnight at room temperature. It was then washed with dilute hydrochloric acid in order to hydrolyze the tin compound catalyst and remove the tin salts. This was repeated several times until the tin salts had been completely removed. The yield was one hundred and twenty grams of a light red oil.

A fifty percent solution of the product was prepared in turpentine and used as a coating for black metal. After baking for one hour at 150° C. it formed a hard flexible film which did not rupture when the metal was bent.

*Example 3*

Two hundred grams of linseed oil which had been chilled and filtered were dissolved in 200 cc. of carbon tetrachloride and fifty grams of furane added. The mixture was placed in a three necked round bottom flask equipped with a mechanical stirrer, thermometer and dropping funnel. Twenty grams of stannic chloride were dissolved in 100 cc. of carbon tetrachloride and this solution added to the mixture. The addition required one and one-half hours during which time the temperature of the reaction mixture was maintained between 1° and 2° C. by means of an ice bath. After this addition the mixture was allowed to gradually come to room temperature and it was held at this temperature for a period of twelve hours. The catalyst was then hydrolyzed and the tin salts removed as previously described. The solvent was then removed under a vacuum over a water bath. The product was a light reddish colored, transparent oil which gave very hard, flexible films when baked on metal. It also can be easily air dried to give hard, flexible films. It may be used as a coating material, as a component of varnishes, etc.

In the preceding examples we have demonstrated that furane and substituted furanes such as benzofurane, furfural, etc., can be condensed with unsaturated glycerides in the presence of Friedel-Crafts catalysts such as stannic chloride to give liquid products which, after hydrolysis of the catalyst used, can be polymerized to flexible resins. Although our examples refer to the specific use of stannic chloride we could also use boron trichloride, titanium tetrachloride, aluminum chloride or other catalyst of the Friedel- Crafts class. In our examples we have referred to the use of unsaturated fish oil and linseed oil but we could obtain the highly unsaturated glycerides from any one of many other sources.

We believe that our products result from Friedel-Crafts condensations between the olefinic bonds of the triglyceride and the unsaturated bonds of the furane ring. Our final products are not highly polymerized resins, but rather liquids which have the property of polymerizing and hardening either at atmospheric conditions or under heat.

This application is a continuation in part of our copending application, Serial No. 322,856, filed March 7, 1940.

We claim:

1. The process which comprises reacting a compound having a furane ring with a glyceride of fatty acid containing at least two double bonds and at least 18 carbon atoms in the presence of a Friedel-Crafts catalyst, said reaction being conducted at a temperature below 75° C.

2. A process as set forth in claim 1 wherein said compound is furfural.

3. A process as set forth in claim 1 wherein said compound is cumarone.

4. A process as set forth in claim 1 wherein said glyceride is a fish oil glyceride.

5. The process which comprises reacting a compound having a furane ring with a glyceride of a fatty acid containing at least 2 double bonds and at least 18 carbon atoms in the presence of a Friedel-Crafts catalyst, said reaction being conducted at a temperature below 75° C., hydrolyzing the catalyst and recovering the liquid condensation product substantially free of catalyst.

6. The process which comprises reacting in an organic solvent a compound having a furane ring with a glyceride of a fatty acid containing at least 2 double bonds and at least 18 carbon atoms, said reaction being conducted in the presence of a Friedel-Crafts catalyst and at a temperature below 75° C.

7. A process as set forth in claim 1 wherein said reaction is begun while the reactants are maintained at a temperature below the boiling point of said compound.

8. A process which comprises reacting in an organic solvent and in the presence of a Friedel-Crafts catalyst a compound having a furane ring with a glyceride of a fatty acid containing at least 18 carbon atoms and at least 2 double bonds, said reaction being conducted at a temperature below 75° C., hydrolyzing the catalyst and recovering a liquid condensation product substantially free from catalyst.

ANDERSON W. RALSTON.
MILES R. McCORKLE.
ROBERT J. VANDER WAL.

REFERENCES CITED

The following references are of record in the file of this patent:

UNITED STATES PATENTS

| Number | Name | Date |
|---|---|---|
| 1,294,836 | Schlatter | Feb. 18, 1919 |
| 2,058,597 | Koenig (2) | Oct. 27, 1936 |
| 2,077,485 | Lawson et al. | Apr. 20, 1937 |
| 2,152,683 | Eichwald | Apr. 4, 1939 |
| 2,116,073 | Koenig (1) | May 3, 1938 |

FOREIGN PATENTS

| Number | Country | Date |
|---|---|---|
| 747,583 | France | Apr. 4, 1933 |